(12) United States Patent
Itomi

(10) Patent No.: US 7,607,526 B2
(45) Date of Patent: Oct. 27, 2009

(54) ANTI-REVERSE INPUT CLUTCH

(75) Inventor: Shoji Itomi, Kuwana (JP)

(73) Assignee: NTN Corporation, Osaka (JP)

( * ) Notice: Subject to any disclaimer, the term of this patent is extended or adjusted under 35 U.S.C. 154(b) by 322 days.

(21) Appl. No.: 11/439,194

(22) Filed: May 24, 2006

(65) Prior Publication Data
US 2006/0278494 A1 Dec. 14, 2006

(30) Foreign Application Priority Data
Jun. 8, 2005 (JP) ............................. 2005-168198
Jan. 19, 2006 (JP) ............................. 2006-010776

(51) Int. Cl.
*F16D 59/00* (2006.01)
(52) U.S. Cl. .................... 192/223.2; 188/134
(58) Field of Classification Search ................. 192/223, 192/223.2
See application file for complete search history.

(56) References Cited

U.S. PATENT DOCUMENTS

| 2,076,635 | A | * | 4/1937 | Halstead ..................... 192/44 |
| 2,300,022 | A | * | 10/1942 | Swartz ..................... 192/223.2 |
| 2,429,901 | A | * | 10/1947 | Spraragen ................. 192/223.2 |
| 2,583,428 | A | * | 1/1952 | Houplain .................. 192/223.2 |
| 3,102,618 | A | * | 9/1963 | Lund ........................... 192/223 |
| 3,119,479 | A | * | 1/1964 | Lund ........................... 192/223 |
| 3,270,578 | A | * | 9/1966 | Leadbeater .................. 474/21 |
| 3,414,095 | A | * | 12/1968 | Kalns ......................... 192/223 |
| 5,271,486 | A | * | 12/1993 | Okamoto et al. ............. 192/45 |
| 5,652,418 | A | * | 7/1997 | Amonett ................... 200/38 B |
| 6,267,218 | B1 | * | 7/2001 | Hochmuth et al. ....... 192/223.2 |
| 6,971,719 | B2 | * | 12/2005 | Liu et al. ................. 192/223.2 |
| 2001/0013453 | A1 | * | 8/2001 | Hori ............................ 192/45 |
| 2007/0132196 | A1 | * | 6/2007 | Puzio et al. ................ 279/2.21 |

FOREIGN PATENT DOCUMENTS

| GB | 2229236 A | * | 9/1990 |
| JP | 2-271116 | | 11/1990 |
| JP | 2004011784 A | * | 1/2004 |
| JP | 2004204871 A | * | 7/2004 |
| JP | 2005188558 A | * | 7/2005 |
| WO | WO 2008001842 A1 | * | 1/2008 |

* cited by examiner

Primary Examiner—Rodney H Bonck
(74) Attorney, Agent, or Firm—Wenderoth, Lind & Ponack, LLP.

(57) ABSTRACT

An anti-reverse input clutch is provided which includes an output member including an output shaft held so as to be rotatable about the axis of an input member, and a cam member which is a separate member from the output shaft and on which cam surfaces are formed. The cam member is rotationally fixed to the output shaft. Thus, each of the output shaft and the cam shaft can be easily formed, so that it is possible to significantly reduce the time and cost for manufacturing the output member and improve the freedom of design thereof.

9 Claims, 5 Drawing Sheets

ANTI-REVERSE INPUT CLUTCH

BACKGROUND OF THE INVENTION

This invention relates to an anti-reverse input clutch which transmits torque only from an input member to an output member and not from the output member to the input member.

Such an anti-reverse input clutch transmits torque applied to the input member in either direction to the output member but does not transmit reverse input torque applied to the output member to the input member. FIGS. 8A and 8B show a clutch having such a reverse input blocking function disclosed in Japanese patent publication 2-271116A. This clutch includes an input member 51 and an output member 52. A pin 53 secured to the input member 51 is inserted in a pin hole 54 formed in the output member with a slight clearance defined therebetween in the rotational direction. The clutch further includes a stationary outer ring 55 having a cylindrical inner surface radially opposed to the outer periphery of the output member 52, defining wedge-shaped spaces 56 therebetween which gradually narrow from the central portion thereof toward both circumferential ends. A pair of rolling elements 57 and an elastic member 58 are received in each wedge-shaped space 56 with the elastic member 58 disposed between the rolling elements 57. The clutch further includes a retainer 59 coupled to the input member 51 through the pin 53 and having legs 59a each inserted between a pair of adjacent wedge-shaped spaces 56. Driving and driven shafts (not shown) are inserted into the input member 51 and the output member 52, respectively, and coupled thereto through serrations.

Because the rolling elements 57 are biased toward the narrow portions of the respective wedge-shaped spaces by the elastic members 58, even if reverse input torque is applied to the output member 52, the rear one of each pair of the rolling elements 57 with respect to the rotational direction of the output member 52 engages the inner periphery of the outer ring 55 and the outer periphery of the output member 52, thus locking the output member 52, so that such reverse input torque is not transmitted to the input member 51.

When input torque is applied to the input member 51, the legs 59a of the retainer 59, which is rotationally fixed to the input member 51, push the rear one of each pair of rolling elements 57 with respect to the rotational direction of the input member 51 against the force of the elastic member 58, so that the rear one of each pair of rolling elements 57 disengages from the inner periphery of the outer ring 55 and the outer periphery of the output member 52. Thus, the rotation of the input member 51 is transmitted to the output member 52 with a slight angular delay.

In this anti-reverse input clutch, on the outer periphery of a large-diameter portion 60 at the axially central portion of the output member 52, cam surfaces 60a are formed which define the wedge-shaped spaces 56 in cooperation with the inner cylindrical surface of the outer ring 55. Thus, the output member 52 is complicated in structure and only limited options are available as methods for forming such an output member 52. It is therefore troublesome and thus costly to form such an output member, which will push up the manufacturing cost of the entire clutch.

An object of the present invention is to provide an anti-reverse input clutch of which the output member can be formed easily at a low cost.

SUMMARY OF THE INVENTION

According to the present invention, the output member comprises an output shaft which is held so as to be rotatable about the axis of the input member, and a cam member which is a separate member from the output shaft and on which the cam surfaces are formed, the cam member being rotationally fixed to the output shaft. Since the output member comprises the output shaft and the cam member which are separate members from each other, each of the output shaft and the cam shaft can be easily formed, so that it is possible to significantly reduce the time and cost for manufacturing the output member and improve the freedom of design thereof.

Preferably, a plurality of adjacent ones of the rolling elements are disposed between each of the legs of the retainer and the elastic member while in contact with each other. With this arrangement, it is possible to reduce the size of the entire clutch without reducing the maximum reverse input torque that can be blocked, and thus to further reduce the cost.

Preferably, the output shaft includes a flange, and the stationary member includes flange restricting portions which sandwich the flange from both axial sides thereof. With this arrangement, even if radial loads and/or axial loads act on the output shaft, the output shaft and the cam member, which is coupled to the output shaft, will not significantly incline or move axially relative to the stationary member. The clutch thus operates stably.

The cam member of the output member is preferably coupled to the output shaft so as to be movable to an eccentric position relative to the output shaft. With this arrangement, even if the inner ring and the outer ring are not exactly coaxial with each other when the clutch is assembled, because the rollers are wedged into the narrow portions of the respective wedge-shaped spaces by the springs during use, the inner ring will automatically move to a position where it is coaxial with the outer ring. Thus, there should be no run-out of the inner ring relative to the outer ring. The clutch thus operates stably.

At least one of the output shaft and the cam member of the output shaft is preferably made of one of sintered metals, forged metals and plastics.

Since the output member comprises the output shaft and the cam member which are separate members from each other, each of the output shaft and the cam shaft can be easily formed, so that it is possible to significantly reduce the time and cost for manufacturing the output member and improve the freedom of design thereof and thus to reduce the manufacturing cost of the entire clutch. Such clutches can therefore be stably mass-produced.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
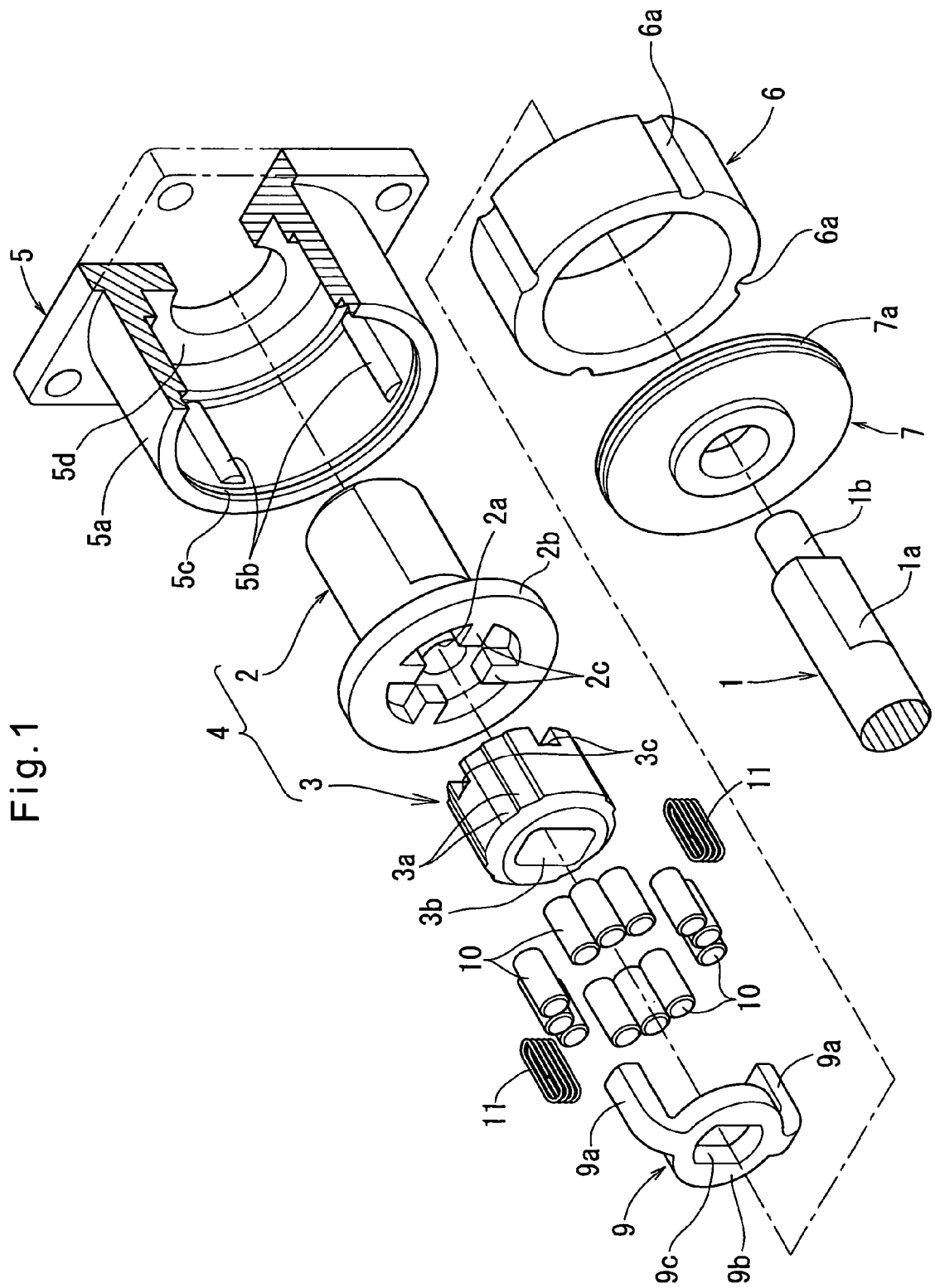
FIG. 1 is an exploded perspective view of a clutch according to a first embodiment of the present invention.
Figure 2:
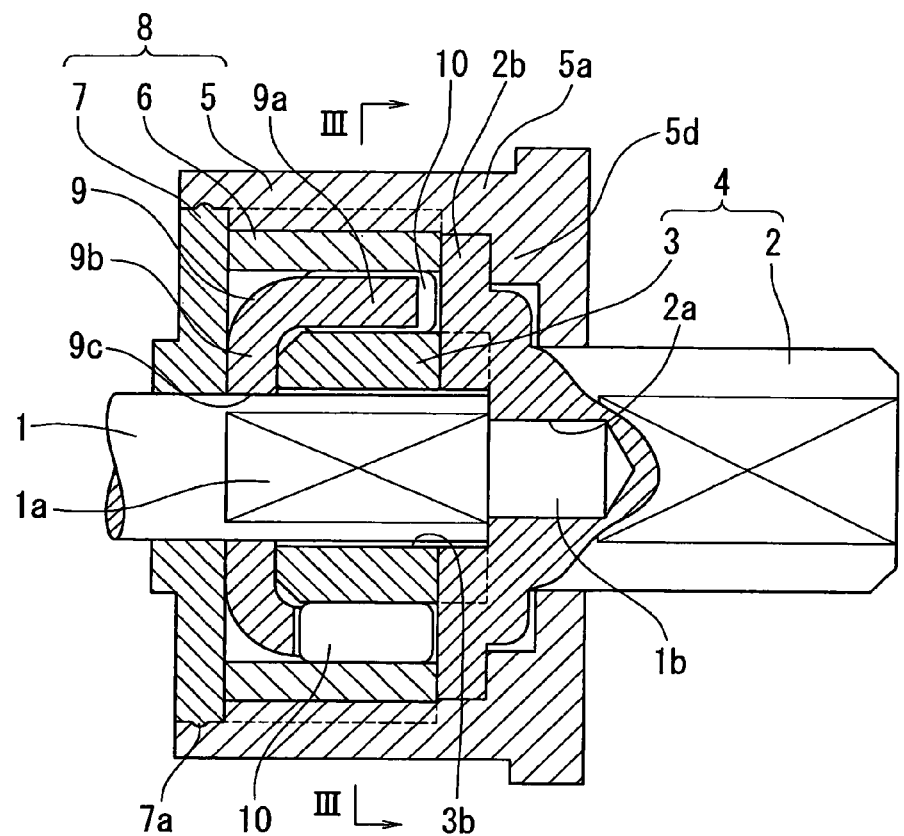
FIG. 2 is a vertical sectional front view of the clutch of FIG. 1.
Figure 3:
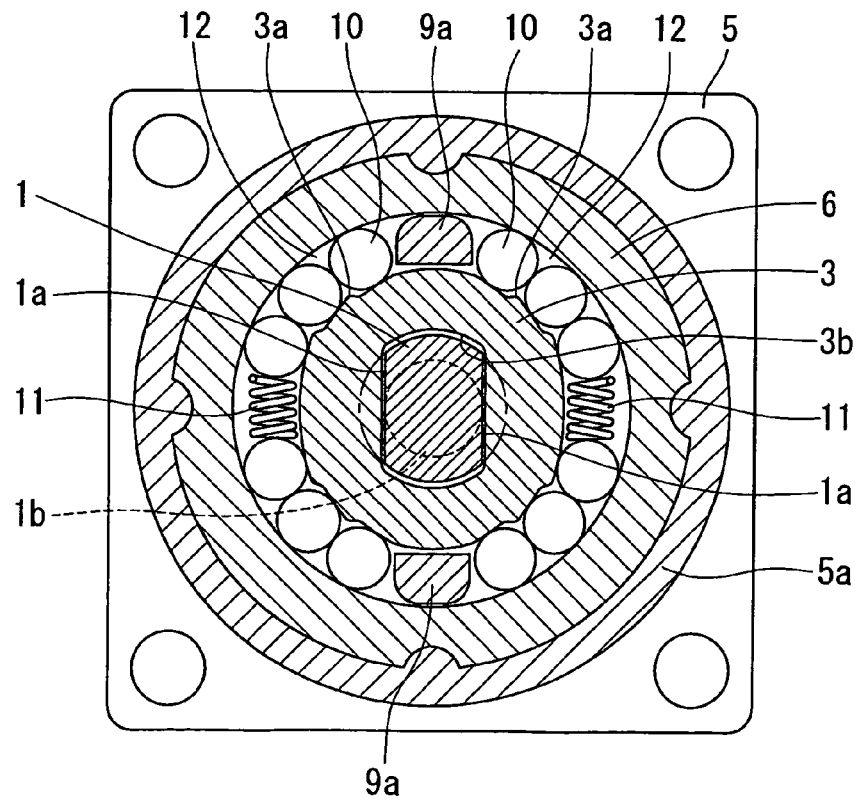
FIG. 3 is a sectional view taken along line III-III of FIG. 2.

Now referring to FIGS. 1 to 7, the embodiments according to the present invention are described. First, FIGS. 1 to 3 show the first embodiment. As shown in FIGS. 1 and 2, the anti-reverse input clutch of this embodiment includes an input shaft (input member) 1, an output member 4 comprising an output shaft 2 and an inner ring (cam member) 3 defining a plurality of cam surfaces 3a on the outer periphery thereof, a stationary member 8 comprising a housing 5, an outer ring 6 and a presser lid 7, and a retainer 9 having two legs 9a inserted between the inner ring 3 and the outer ring 6. Cylindrical rollers (rolling elements) 10 and springs (elastic members) 11 are disposed between the two legs 9a of the retainer. The output shaft 2 and the inner ring 3, which constitute the output member 4, are preferably made of sintered metal, forged metal or plastic.

The input shaft 1 has a front end portion formed with two parallel flat surfaces 1a on its outer periphery and extending through a disk portion 9b of the retainer 9 and inserted in a bore 3b formed in the inner ring 3. A small-diameter cylindrical protrusion 1b is provided on the end surface of the front end portion of the input shaft 1 and is fitted in a hole 2a formed centrally in an end surface of the output shaft 2. The input shaft 1 is thus rotatable with its axis in alignment with the axis of the output shaft 2.

The output shaft 2 has a flange 2b at its end facing the inner ring 3. The flange 2b has four protrusions 2c formed on the inner edge thereof and engaged in recesses 3c formed in the end surface of the inner ring 3 facing the output shaft 2, thereby rotationally coupling the output shaft 2 to the inner ring 3. But the output shaft 2 and the inner ring 3 may be rotationally coupled together by means other than the means comprising the protrusions 2c and the recesses 3c.

With the outer ring 6 fitted in a cylindrical portion 5a of the housing 5, the presser lid 7 is fitted in the cylindrical portion 5a of the housing 5. The cylindrical portion 5a of the housing 5 has four axial ribs 5b formed on the inner periphery thereof and engaged in axial grooves 6a formed in the outer periphery of the outer ring 6, thereby rotationally coupling the outer ring 6 to the housing 5. The cylindrical portion 5a of the housing 5 is also formed with an annular groove 5c in the inner periphery thereof. The presser lid 7 is formed with a corresponding annular rib 7a on the outer periphery thereof that is engaged in the annular groove 5c to prevent separation of the presser lid 7 from the housing 5. A shoulder 5d is formed on the inner periphery of the cylindrical portion 5d of the housing 5 near its end remote from the presser lid 7. The shoulder 5d and the end of the outer ring 6 facing the shoulder 5d together serve as a flange restrictor by loosely sandwiching the flange 2b of the output shaft 2 therebetween. The flange restrictor prevents the output shaft 2 and the inner ring 3, which is coupled to the output shaft 2, from markedly inclining or axially moving relative to the stationary member 8 even under radial and/or axial loads.

The legs 9a of the retainer 9 are provided on diametrically opposite points along the outer edge of the disk portion 9b. The disk portion 9b is centrally formed with a hole 9c into which the front end portion of the input shaft 1 is tightly fitted. The retainer 9 is thus rotationally coupled to the input shaft 1.

The bore 3b formed in the inner ring 3 has a cross-section that is substantially identical to that of the front end portion of the input shaft 1, but is shaped such that a slight circumferential clearance is present between the bore 3b and the front end portion of the input shaft 1. Thus, the rotation of the input shaft 1 is transmitted to the output shaft 2 with a slight angular delay. Means for transmitting the rotation of the input shaft to the inner ring with a slight angular delay is not limited to the one shown. For example, the input shaft and the inner ring may be coupled together through e.g. serrations arranged with a circumferential play therebetween.

As shown in FIG. 3, the cam surfaces 3a of the inner ring 3 are circumferentially inclined, thereby defining a wedge-shaped space 12 that gradually narrows from one circumferential end thereof toward the other between each cam surface 3a and the inner cylindrical surface of the outer ring 6. One of the cylindrical rollers 10 is received in each wedge-shaped space 12. The wedge-shaped spaces 12 comprise four groups of wedge-shaped spaces, each group comprising three circumferentially adjacent wedge-shaped spaces defined by three circumferentially adjacent cam surfaces that are inclined in the same direction. The cam surfaces defining the wedge-shaped spaces of any adjacent groups are circumferentially inclined in opposite directions to each other. In each of two spaces between adjacent pairs of groups which are circumferentially adjacent the wider circumferential ends of the wedge-shaped spaces, one of the springs 11 is mounted to bias the three rollers on each side toward the narrow circumferential ends of the respective wedge-shaped spaces while keeping the three rollers in contact with each other. In each of two spaces between adjacent pairs of groups which are circumferentially adjacent the narrower circumferential ends of the wedge-shaped spaces, one of the legs 9a of the retainer 9 is inserted while keeping a slight distance from the adjacent roller on each side thereof.

With this arrangement, if reverse input torque is applied to the output shaft 2, the three rollers 10 in the rear of each spring 11 with respect to the rotational direction of the output shaft 2 are pushed into the narrow portions of the respective wedge-shaped spaces 12 by the spring 11, thereby locking the inner ring 3 by the engagement between the inner periphery of the outer ring 6 and the outer periphery of the inner ring 3. Thus, torque applied to the output shaft 2 is not transmitted to the input shaft 1.

Conversely, when input torque is applied to the input shaft 1, because the retainer 9 is rotationally coupled to the input shaft 1, the three rollers 10 in the rear of each spring 11 with respect to the rotational direction of the input shaft 1 are pushed by the leg 9a toward the wider ends of the respective wedge-shaped spaces 12 against the force of the spring 11, thereby disengaging the outer periphery of the inner ring 3 from the inner periphery of the outer ring 6. When the input shaft 1 further rotates and the flat surfaces 1a engages the flat surfaces of the bore 3b of the inner ring 3, rotation of the input shaft 1 is transmitted to the output shaft 2 through the inner ring 3.

In this embodiment, the cam surfaces 3a of the inner ring 3 are convex curved surfaces as shown in FIG. 3. Thus, even if any of the rollers 10 is skewed, it will come into line contact with the cam surface 3a, and will never wedge into the cam surface 3a at its end. The rollers 10 can therefore always smoothly disengage.

Since the output member 4 comprises the output shaft 2 and the inner ring 3, which is a separate member from the output shaft 2, each of the output shaft 2 and the inner ring 3 can be easily formed. Thus, the output member 4 according to the present invention can be formed far more easily at a far lower cost with a greater freedom of design than integral output members.

Figure 4:
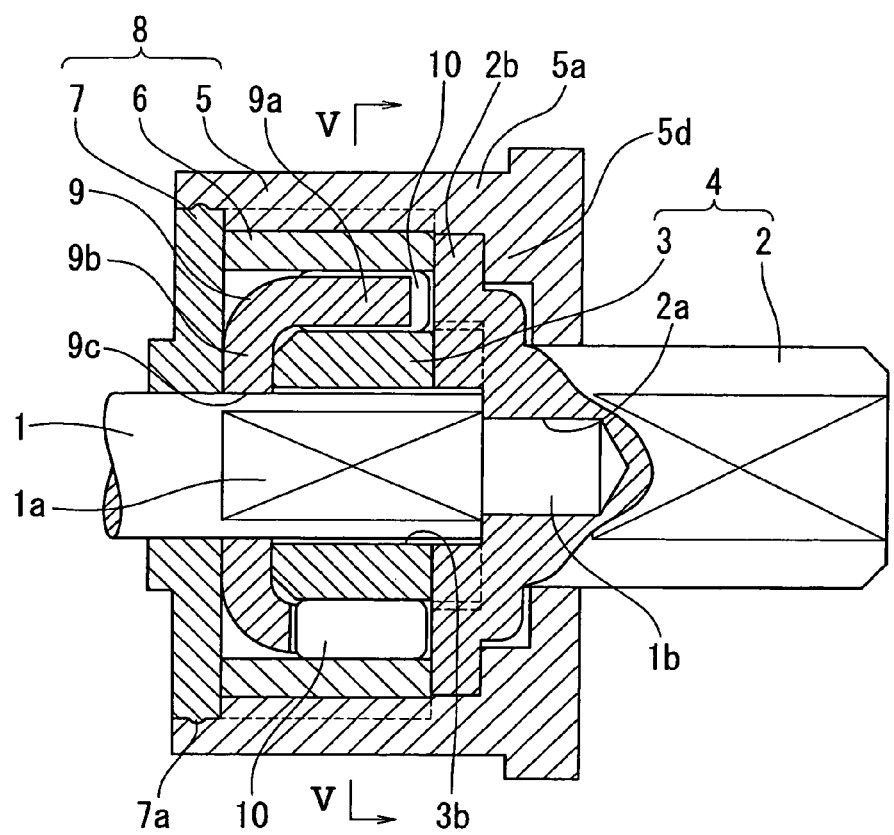
FIG. 4 is a vertical sectional front view of a clutch having a different coupling structure through which an output shaft is coupled to an inner ring.
Figure 5:
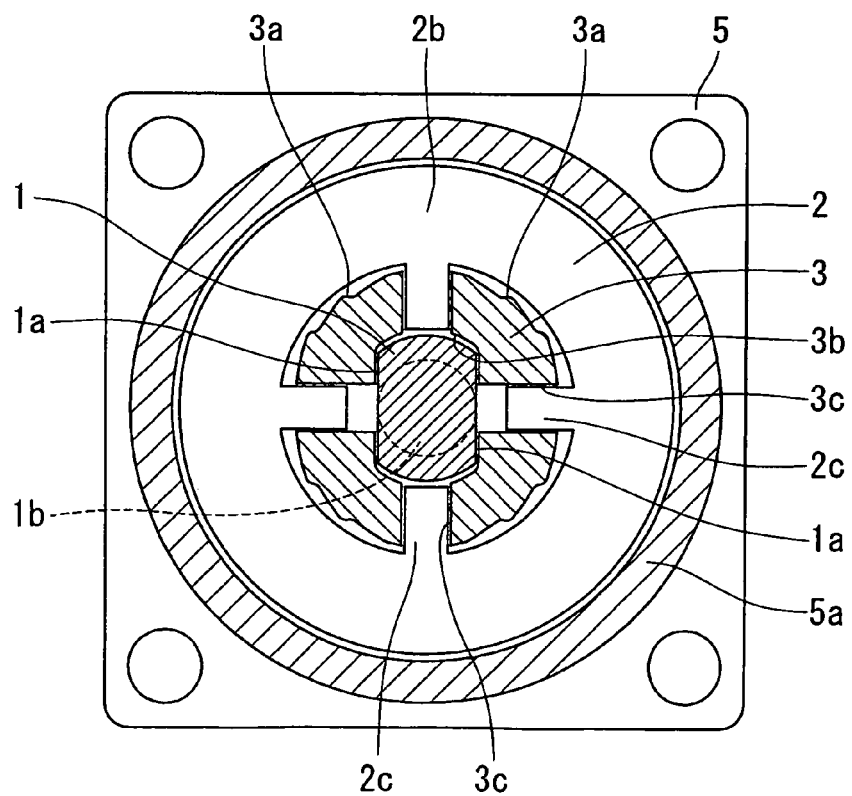
FIG. 5 is a sectional view taken along line V-V of FIG. 4.

FIGS. 4 and 5 show a modified arrangement for coupling the output shaft 2 to the inner ring 3. In this arrangement, the flange 2b of the output shaft 2 has a larger inner diameter than the outer diameter of the inner ring 3, and the protrusions 2c on the inner edge of the flange 2b have a width smaller than the width of the recesses 3c formed in the end surface of the inner ring 3 so that the inner ring 3 can move radially by a distance equal to the gap therebetween. The inner ring 3 can therefore rotate with its axis offset from the axis of the output shaft 2.

With this arrangement, even if the inner ring 3 and the outer ring 6 are not exactly coaxial with each other when the clutch is assembled, because the rollers 10 are wedged into the narrow portions of the respective wedge-shaped spaces 12 by the springs 11 during use, the inner ring 3 will automatically move to a position where it is coaxial with the outer ring 6. Thus, there should be no run-out of the inner ring 3 relative to the outer ring 6. By positively preventing run-out of the inner ring 3, it is possible to retain the rollers at positions exactly as designed, thereby making it possible to simultaneously unlock the rollers 10 (and disengage the inner periphery of the outer ring 6 and the outer periphery of the inner ring 3 from each other). This stabilizes the torque necessary to unlock the rollers, and prevents excessive loads from being applied to the rollers when unlocking the rollers, which in turn minimizes the possibility of damage to the cam surfaces 3a, thus prolonging the life of the inner ring 3.

Figure 6:
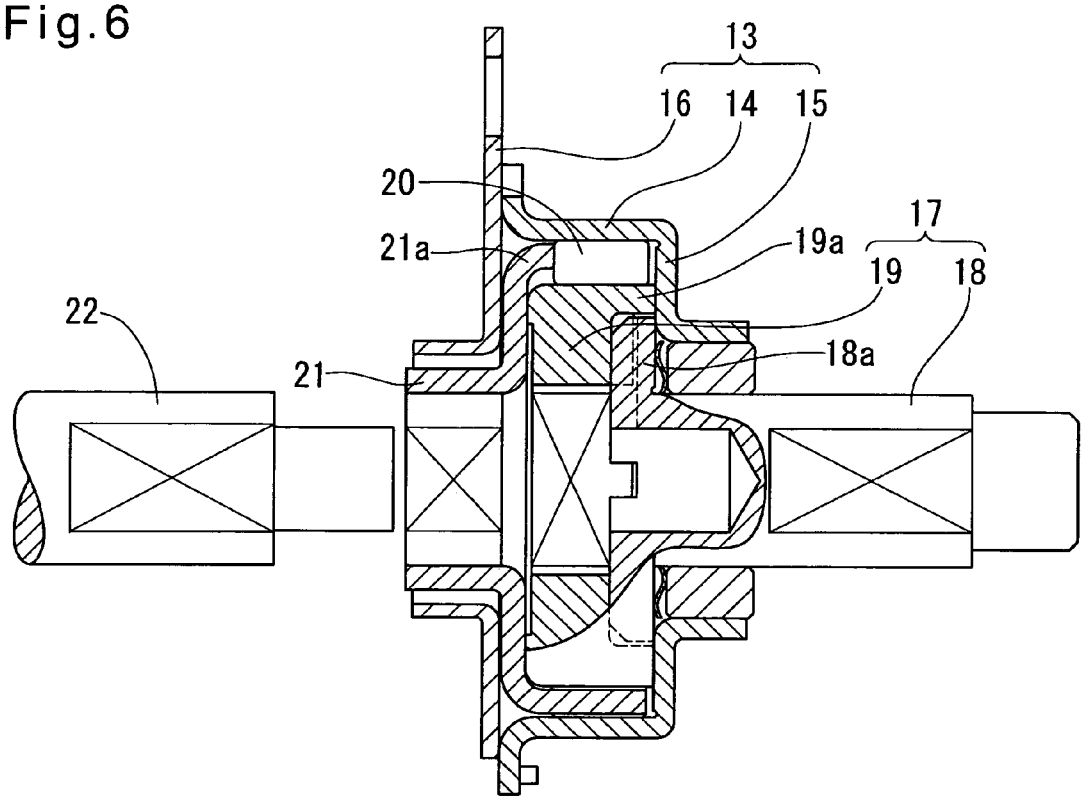
FIG. 6 is a vertical sectional front view of a clutch according to a second embodiment of the present invention.
Figure 7:
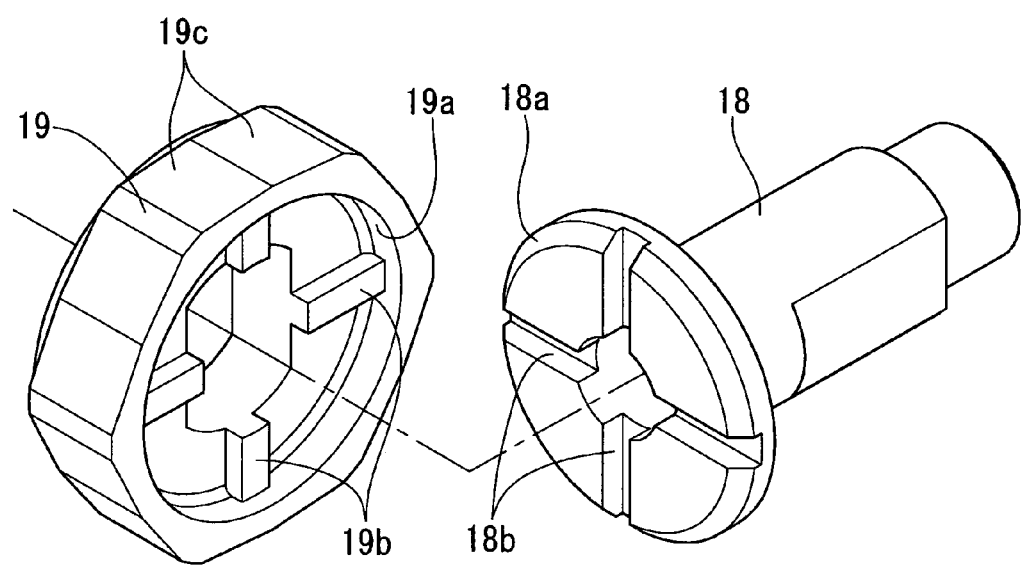
FIG. 7 is an exploded perspective view of an output shaft of the clutch of FIG. 6.
Figure 8A:
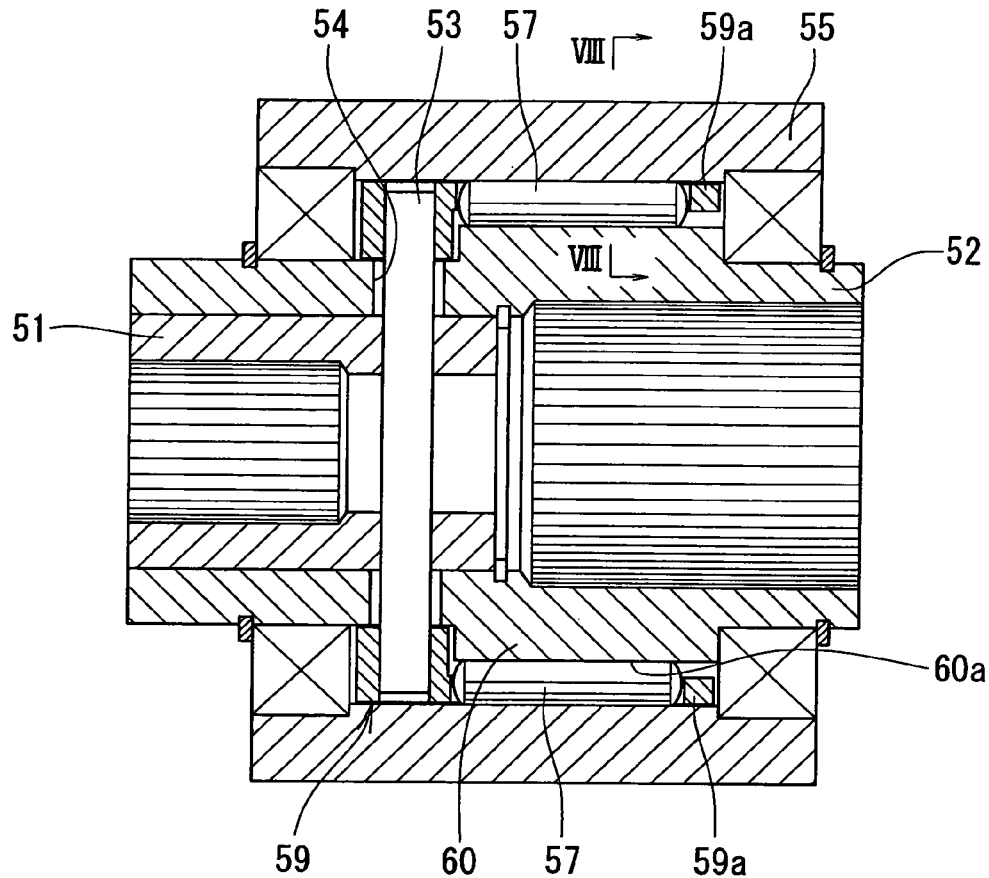
FIG. 8A is a vertical sectional front view of a conventional clutch.
Figure 8B:
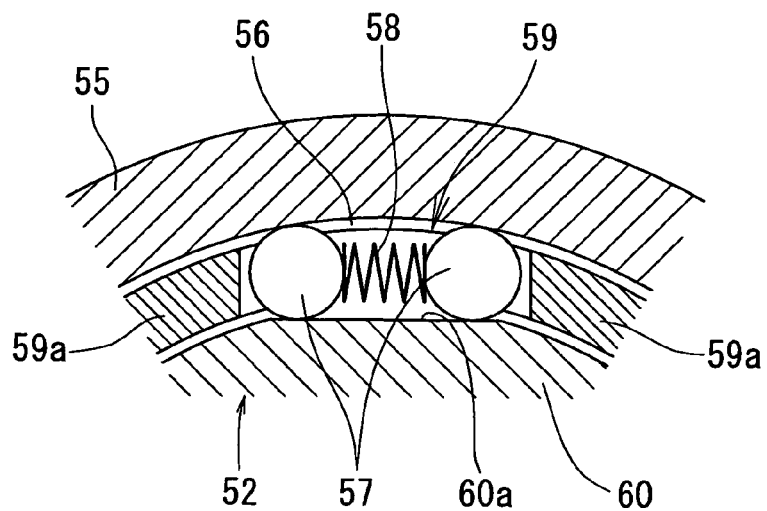
FIG. 8B is a sectional view taken along line VIII-VIII of FIG. 8A.

FIGS. 6 and 7 show the second embodiment, which includes a stationary member 13 comprising an outer ring 14 and a housing 15 which are integral with each other. The outer ring 14 has a flange at one end thereof to which a presser lid 16 is mounted. The clutch of this embodiment further includes an output member 17 comprising an output shaft 18 and an inner ring 19 which are separate members from each other. The output shaft 18 has a flange 18a inserted in a thin-walled portion 19a of the inner ring 19 with protrusions 19b formed on the thin-walled portion 19a engaged in recesses 18b formed in the flange 18a, so that the output shaft 18 is rotationally coupled to the inner ring 19. The flange 18a of the output shaft 18 has an outer diameter greater than the inner diameter of the thin-walled portion 19a of the inner ring 19, and the recesses 18b of the output shaft 18 have a larger width than the protrusions 19b of the inner ring 19. Thus, the inner ring 19 can rotate with its axis offset from the output shaft 18. Circumferentially arranged cam surfaces 19c are formed on the outer periphery of the inner ring 19. Any circumferentially adjacent cam surfaces 19c are circumferentially inclined in opposite directions to each other. One roller 20 is disposed between each leg 21a of the retainer 21 and each spring (not shown). Otherwise, this embodiment is identical in structure to the first embodiment. Functionally, too, rotation of the input shaft 22 is transmitted to the output shaft 18, while reverse input from the output shaft 18 is blocked, in the same manner as in the first embodiment.

Thus, as with the first embodiment, the output shaft 18 and the inner ring 19 of this embodiment can also be formed easily at a low cost. Since the output shaft 18 and the inner ring 19 are coupled together so as to be rotatable with their axes offset from each other, runout of the inner ring is effectively prevented, so that the life of the inner ring is long.

What is claimed is:

1. An anti-reverse input clutch comprising an input member and an output member that can rotate about a common axis, a torque transmitter for transmitting rotation of said input member to said output member with a slight angular delay, a stationary member having a radially inner or outer cylindrical surface, said output member having a radially inner or outer opposed surface radially opposed to said cylindrical surface, said output member having cam surfaces formed on said opposed surface, each of said cam surfaces and said cylindrical surface defining a wedge-shaped space that narrows from one circumferential end thereof toward another circumferential end thereof, a retainer rotationally fixed to said input member and including legs inserted between said output member and said stationary member, rolling elements each received in one of said wedge-shaped spaces, and an elastic member disposed between an adjacent pair of said rolling elements to bias said rolling elements toward said another circumferential end of said respective wedge-shaped spaces, whereby when said input member rotates, said legs of said retainer push at least some of said rolling elements against the force of said elastic member, thereby transmitting torque from said input member to said output member, said output member comprising an output shaft which is held so as to be rotatable about said common axis, and a cam member which is a separate member from said output shaft and on which said cam surfaces are formed, said cam member being rotationally fixed to said output shaft, wherein said cam member of said output member is coupled to said output shaft so as to be movable to an eccentric position relative to said output shaft, and wherein said cam surfaces are circumferentially uniformly arranged, and wherein said output shaft includes a flange, and wherein said stationary member includes flange restricting portions which sandwich said flange from both axial sides thereof.

2. The anti-reverse input clutch of claim 1 wherein a plurality of adjacent ones of said rolling elements are disposed between each of said legs of said retainer and said elastic member while in contact with each other.

3. The anti-reverse input clutch of claim 1 wherein at least one of said output shaft and said cam member of said output shaft is made of one of sintered metals, forged metals and plastics.

4. The anti-reverse input clutch of claim 1, wherein said rolling elements comprise cylindrical rollers.

5. The anti-reverse input clutch of claim 4, wherein said rolling elements are disposed in said wedge-shaped spaces so as to be movable circumferentially along said cam surfaces, respectively.

6. The anti-reverse input clutch of claim 4, wherein said rolling elements are disposed in said wedge-shaped spaces so as to be movable circumferentially along said cam surfaces, respectively, between engaged positions at first circumferential ends of said cam surfaces, and disengaged positions at second circumferential ends of said cam surfaces, wherein in said engaged positions, said rolling elements are wedged between said cam surfaces and said cylindrical surface.

7. The anti-reverse input clutch of claim 1 wherein said rolling elements are disposed in said wedge-shaped spaces so as to be movable circumferentially along said cam surfaces, respectively.

8. The anti-reverse input clutch of claim 1, wherein said rolling elements are disposed in said wedge-shaped spaces so as to be movable circumferentially along said cam surfaces, respectively, between engaged positions at first circumferential ends of said cam surfaces, and disengaged positions at second circumferential ends of said cam surfaces, wherein in said engaged positions, said rolling elements are wedged between said cam surfaces and said cylindrical surface.

9. The anti-reverse input clutch of claim 1, wherein said cam surfaces are arranged such that each one of said cam surfaces is disposed diametrically opposite another one of said cam surfaces.

* * * * *